(12) United States Patent
Kaidar et al.

(10) Patent No.: US 7,903,645 B2
(45) Date of Patent: Mar. 8, 2011

(54) METHODS, APPARATUS AND SYSTEMS CONFIGURED FOR HETEROGENEOUS SECURE ASSOCIATIONS IN WI-FI PAN

(75) Inventors: Oren Kaidar, Binyamina (IL); Max Fudim, Newton, MA (US)

(73) Assignee: Intel Corporation, Santa Clara, CA (US)

( * ) Notice: Subject to any disclaimer, the term of this patent is extended or adjusted under 35 U.S.C. 154(b) by 818 days.

(21) Appl. No.: 11/843,545

(22) Filed: Aug. 22, 2007

(65) Prior Publication Data

US 2009/0052467 A1    Feb. 26, 2009

(51) Int. Cl.
H04L 12/56 (2006.01)
H04J 1/16 (2006.01)

(52) U.S. Cl. ......... 370/386; 370/230; 370/252; 370/278; 370/390; 370/419

(58) Field of Classification Search .................. 370/230, 370/252, 386, 389, 419, 278, 390
See application file for complete search history.

(56) References Cited

U.S. PATENT DOCUMENTS 7,792,025 B2 * 9/2010 Segel et al. ............... 370/230
2008/0072035 A1 * 3/2008 Johnson et al. ........... 713/153

FOREIGN PATENT DOCUMENTS

WO    2009/026012 A1    2/2009

OTHER PUBLICATIONS

International Preliminary Report on Patentability for Patent Application No. PCT/US2008/072577, mailed Mar. 4, 2010, 6 pages.
Nyberg, Kaisa et al.,"Wireless Group Security Using MAC Layer Multicast" World of Wireless, Mobile and Multimedia Networks, 2007.WoWMoM 2007. IEEE International Symposium on, Jun. 18-21, 2007, pp. 1-8.
Park, WonJoo et al., "The group security association for secure multicasting" Networks, 2001. Proceedings. Ninth IEEE International Conference on, Oct. 10-12, 2001, pp. 130-133.
International Search Report and written Opinion for PCT application No. PCT/US2008/072577, Mailed on Dec. 30, 2008, 9 Pages.

* cited by examiner

*Primary Examiner* — John Pezzlo
(74) *Attorney, Agent, or Firm* — James S. Finn

(57) ABSTRACT

An embodiment of the present invention provides a method for heterogeneous secure associations in Wireless Fidelity Personal Area Networks (WiFi PAN), comprising designating as a regular mobile node (MN) a MN which establishes a security association with a PAN Master as it advertised by the PAN Master and designating as an outstanding MN as a MN which establishes a security association which differs from that advertised by the PAN Master; and differentiating by the PAN Master between subscribed and not subscribed multicast packets and if a currently processed frame is sent to a subscribed multicast address and both the Regular MN and the Outstanding MN are subscribed to the multicast address, then the PAN Master will convert the frame to unicast and will send to each subscribed Outstanding MN using its unicast security model and to regular MN as regular multicast frame.

21 Claims, 4 Drawing Sheets

METHODS, APPARATUS AND SYSTEMS CONFIGURED FOR HETEROGENEOUS SECURE ASSOCIATIONS IN WI-FI PAN

BACKGROUND

In wireless fidelity (Wi-Fi) networks, a Wi-Fi personal area network (PAN) Master may be preconfigured by an information technology manager to support certain security models. The configuration may be advertised in a Beacon/Probe Response and implies that all Mobile Nodes whose intent is to connect to the PAN have to support certain security models to protect upstream and downstream traffic. Once the PAN Master establishes a secure association with a Mobile Node, all traffic is protected. Unicast security association models differ between different Mobile Nodes connected to the same Wi-Fi PAN, while multicast security association must be the same for all Mobile Nodes connected to the same Wi-Fi PAN. The difference between unicast security associations is limited to encryption mode only while restricting the whole security models to being the same, for example RSN only, TSN only or Open only. Given these restrictions, a strong need exists for methods, apparatus and systems configured for heterogeneous secure associations in Wi-Fi PAN.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
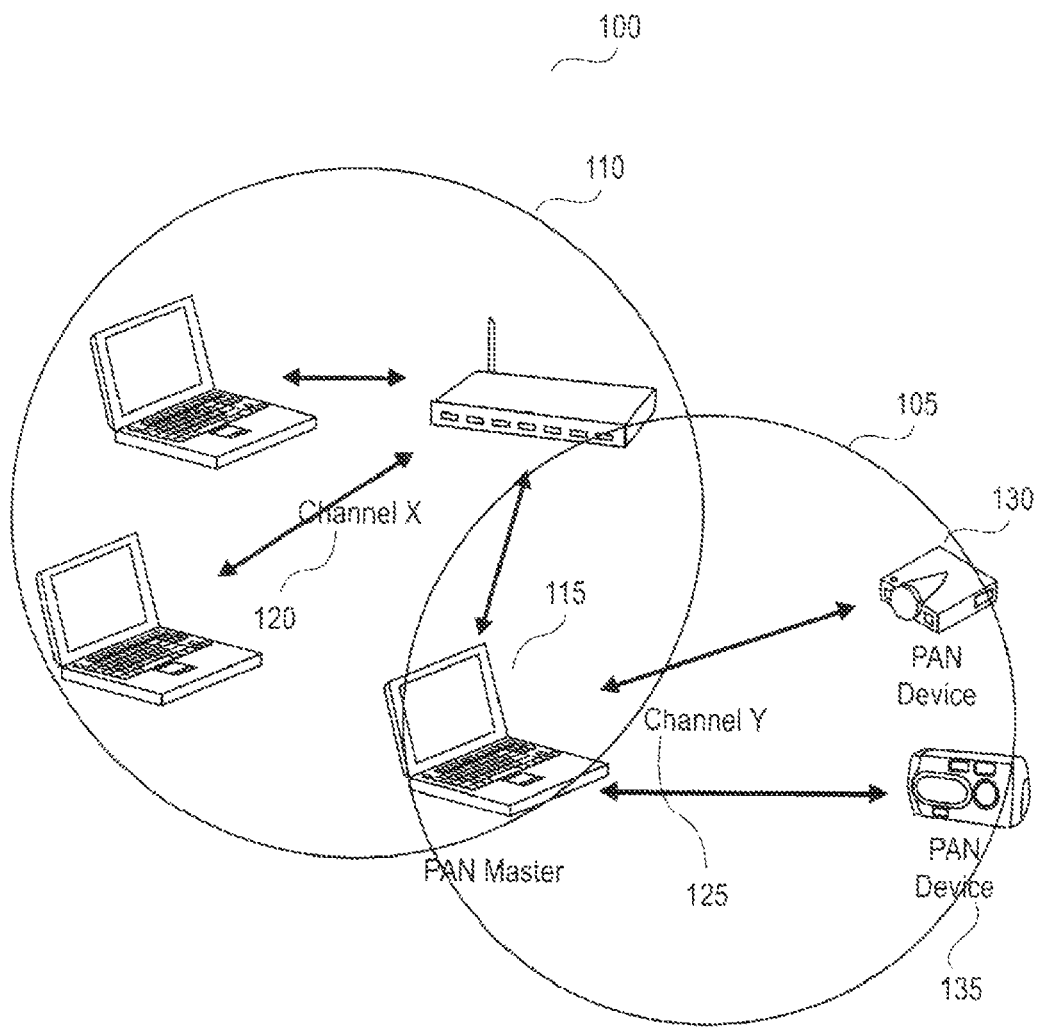
FIG. 1 illustrates a Wi-Fi PAN Infrastructure of an embodiment of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the preset invention may be practiced without these specific details. In other instances, well-known methods, procedures, components and circuits have not been described in detail so as not to obscure the present invention.

In the following detailed description, numerous specific details are set forth in order to provide a thorough understanding of the invention. However, it will be understood by those of ordinary skill in the art that the invention may be practiced without these specific details. In other instances, well-known methods, procedures, components, units and/or circuits have not been described in detail so as not to obscure the invention.

Embodiments of the invention may be used in a variety of applications. Some embodiments of the invention may be used in conjunction with various devices and systems, for example, a transmitter, a receiver, a transceiver, a transmitter-receiver, a wireless communication station, a wireless communication device, a wireless Access Point (AP), a modem, a wireless modem, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a network, a wireless network, a Local Area Network (LAN), a Wireless LAN (WLAN), a Metropolitan Area Network (MAN), a Wireless MAN (WMAN), a Wide Area Network (WAN), a Wireless WAN (WWAN), devices and/or networks operating in accordance with existing IEEE 802.16e, 802.20, 3GPP Long Term Evolution (LTE) etc. and/or future versions and/or derivatives and/or Long Term Evolution (LTE) of the above standards, a Personal Area Network (PAN), a Wireless PAN (WPAN), units and/or devices which are part of the above WLAN and/or PAN and/or WPAN networks, one way and/or two-way radio communication systems, cellular radio-telephone communication systems, a cellular telephone, a wireless telephone, a Personal Communication Systems (PCS) device, a PDA device which incorporates a wireless communication device, a Multiple Input Multiple Output (MIMO) transceiver or device, a Single Input Multiple Output (SIMO) transceiver or device, a Multiple Input Single Output (MISO) transceiver or device, a Multi Receiver Chain (MRC) transceiver or device, a transceiver or device having "smart antenna" technology or multiple antenna technology, or the like. Some embodiments of the invention may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), Time-Division Multiplexing (TDM), Time-Division Multiple Access (TDMA), Extended TDMA (E-TDMA), Code-Division Multiple Access (CDMA), Multi-Carrier Modulation (MDM), Discrete Multi-Tone (DMT), Bluetooth®, ZigBee™, or the like. Embodiments of the invention may be used in various other apparatuses, devices, systems and/or networks.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

Although embodiments of the invention are not limited in this regard, the term "multicast/broadcast" as used herein may include, for example, multicast communication, broadcast communication, wireless multicast communication, wired multicast communication, wireless broadcast communication, wired broadcast communication, multicast communication over the Internet or over a global communication network, broadcast communication over the Internet or over a global communication network, multicast communication using TCP/IP, broadcast communication using TCP/IP, webcast communication (e.g., using the World Wide Web), and/or other types of communication, e.g., non-unicast communication.

Requirements to keep multicast security associations the same for all Mobile Nodes connected to the same Wi-Fi PAN implies a limitation on Wi-Fi PAN use cases, thereby slowing its penetration into the market. It makes all security association models in certain Wi-Fi PAN homogeneous and prevents legacy devices which do not support advanced security models, like RSN, from connecting to the PAN when one of the connected mobile nodes already established a RSN security association. Other embodiments of the present invention may provide a 802.11n secure client which is only allowed to do RSN security while there are legacy devices connected which are TSN only device. Thus, an embodiment of the present invention allows the two clients to operate in the WiFi PAN network.

Embodiments of the present invention provide apparatus, systems and methods to enable a better user experience for Wi-Fi PAN networks by enabling legacy devices with low security capabilities to be connected to the same PAN with devices with advanced security capabilities like those consistent with the standard for the Institute for Electronic and Electrical Engineers (IEEE) 802.11i RSN. Although not limited in this respect, an embodiment of the present invention extends the existing IEEE 802.11i specification mechanism for securing multicast traffic in Wi-Fi PAN network by defining mechanisms which support multiple devices with different security models to be connected to the same PAN network. That is achieved in one embodiment of the present invention by the differentiation between Mobile Nodes that are expecting certain multicast traffic and those that are not.

Thus, an embodiment of the present invention provides a method to establish heterogeneous security associations in Wi-Fi PAN without weakening overall traffic protection between a Wi-Fi PAN Master and all Mobile Nodes connected to it.

An embodiment of the present invention further provides modifying connection establishment and multicast packet processing procedures executed by a Wi-Fi Master in a Wi-Fi PAN and may modify the following standard 802.11 MAC operations:

1. 802.11 Connection Establishment
2. 802.11 Multicast Traffic handling on transmit path (hereafter "multicast traffic" means "downlink multicast traffic").

When a MN decides to establish connection with PAN Master, it generates an Association Request specifying into it the requested security model for multicast and broadcast traffic. In the general case, the MN selects the strongest security model enabled by its configuration and matches it with set of security models advertised by the PAN Manager in Beacon/Probe Response. In case the intersection is null, the connection establishment fails on client side. Some MNs may decide, despite the above, to generate and send an Association request to the infrastructure. In such a case, the infrastructure denies the Association Request. Some embodiments of the present invention may remove such limitation to ensure that Association Request specified above will be accepted by the PAN Master.

A "Regular" MN is defined as a MN which has established a security association as it advertised by the PAN Master. An "Outstanding" MN is defined as a MN which established security association which differs from the advertised by the PAN Master.

In an embodiment of the present invention, the PAN Master will differentiate between subscribed and not subscribed multicast packets. If a currently processed frame is sent to a subscribed multicast address and both "Regular" and "Outstanding" MN are subscribed to the multicast address, then the PAN Master will convert the frame to unicast and will send it to each subscribed "Outstanding" MN using its unicast security model, or in other words process multiple unicast frames instead of single multicast one. For all "Regular" MNs the PAN Master will send the frame as regular multicast one. If a currently processed frame is targeted to an unsubscribed multicast destination, then PAN Master processes it in regular transmit flow.

Figure 2:
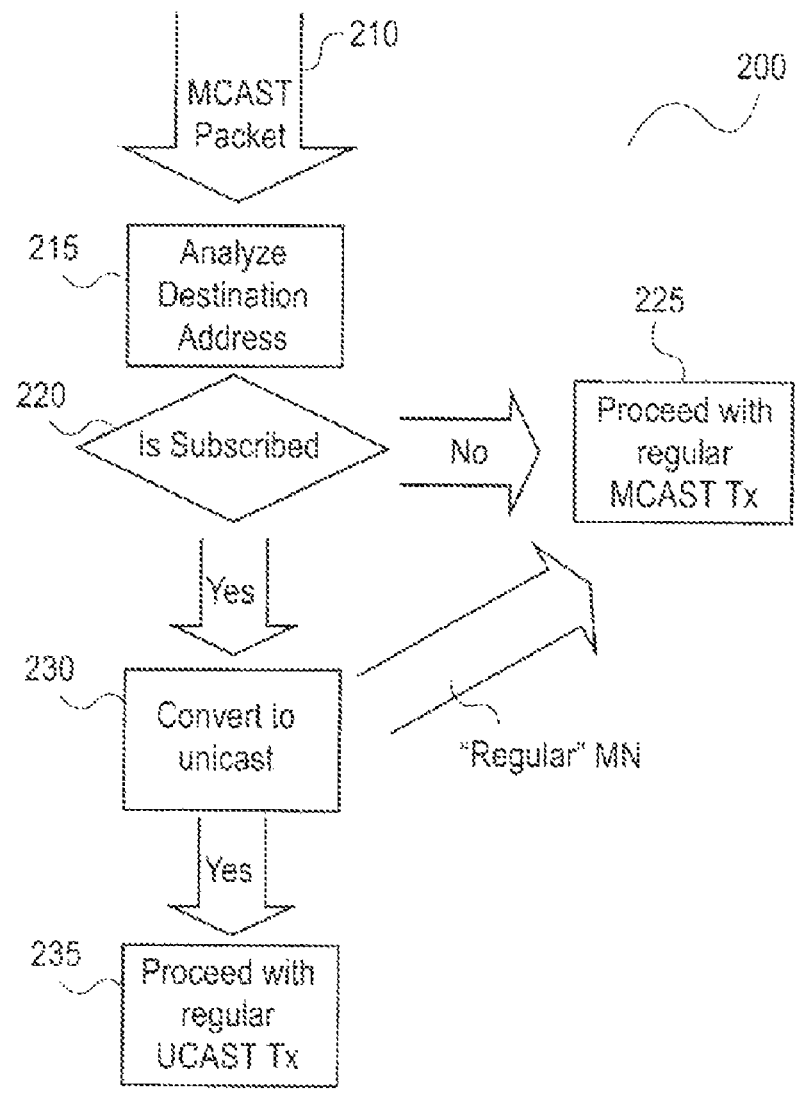
FIG. 2 shows MCAST Transmit Flow by PAN Master of an embodiment of the invention.

Turning now to FIG. 2 at 200 is illustrated a MCAST Transmit Flow by a PAN Master of an embodiment of the invention including a sub-flow that may be integrated into the PAN Master regular transmit flow. MCAST packet 210 has the destination address analyzed at 215 and a determination is made at 200 if it is subscribed. If no at 220, at 225 proceed with regular MCAST transmission. If yes at 220, convert to unicast at 230. If MN is "regular" at 230 go to 225 and proceed with regular MCAST transmission. If yes at 230, proceed to 235 and a regular UCAST transmission. For every "outstanding" MN, 230 and 235 are accomplished.

Figure 3:
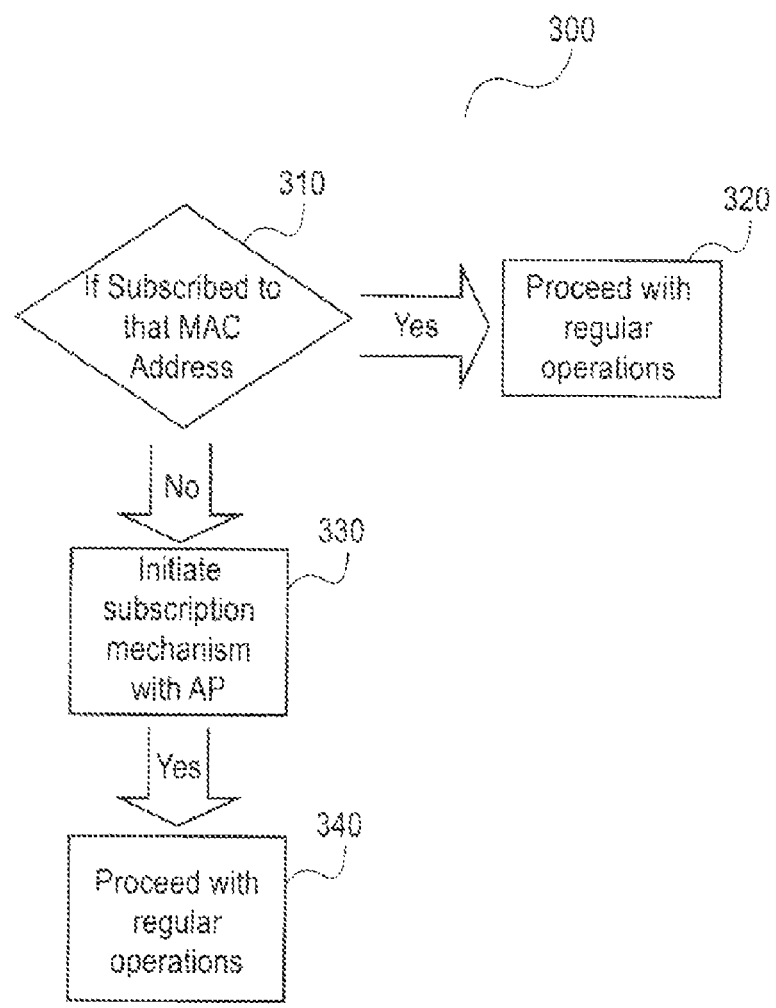
FIG. 3 depicts MCAST Subscription Initiation by a mobile node in an embodiment of the present invention.

To become eligible to receive multicast traffic protected by a security model agreed at association time, the Mobile Node initiates subscription handshake. FIG. 3, generally at 300, illustrates a flow chart integrated as part of regular Multicast Filter configuration flow of an IEEE 802.11 Network Interface Card—although it is understood that the present invention is not limited in this respect.

A determination is made at 310 if Subscribed to that MAC address. If yes, at 320 proceed with regular operations. If no, at 330 initiate subscription mechanism with access point (AP) and at 340 proceed with regular operations.

Figure 4:
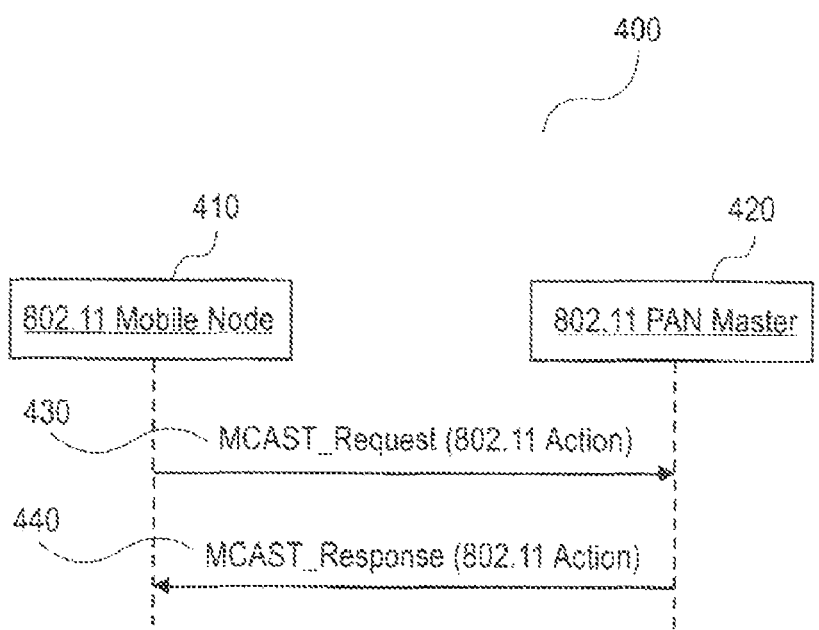
FIG. 4 illustrates MCAST Advanced Services Subscription Flow according to one embodiment of the present invention.

Looking now at FIG. 4 at 400 is an MCAST Advanced Services Subscription Flow. The Mobile Node may use 2-way Multicast Frame Subscription handshake to activate Access Point mechanisms to improve multicast traffic reliability. 802.11 Mobile Node 410 sends at 430 an MCAST_Request to 802.11 PAN Master 420. At 440 802.11 PAN Master 420 sends an MCAST_Response, which may be a broadcast respose. In an embodiment of the present invention, once an MN (client) registers to the directed MCAST, and will receive the MCAST/Broadcast as unicast frames, it needs to drop all incoming MCAST/broadcast frames in order to avoid duplication.

Although not limited in this respect and to exemplify useful embodiments, an embodiment of the present invention provides a solution to establish heterogeneous security associations in Wi-Fi PAN networks, e.g. legacy Wi-Fi Camera which supports neither IEEE 802.11i RSN nor TSN will establish connection and receive downstream multicast traffic from the PAN while to the same PAN connected device which established either RSN or TSN security association.

Some embodiments of the invention may be implemented by software, by hardware, or by any combination of software and/or hardware as may be suitable for specific applications or in accordance with specific design requirements. Embodiments of the invention may include units and/or sub-units, which may be separate of each other or combined together, in whole or in part, and may be implemented using specific, multi-purpose or general processors or controllers, or devices as are known in the art. Some embodiments of the invention may include buffers, registers, stacks, storage units and/or memory units, for temporary or long-term storage of data or in order to facilitate the operation of a specific embodiment.

Some embodiments of the invention may be implemented as a system and use, for example, using a machine-readable medium or article which may store an instruction or a set of instructions that, if executed by a machine, for example, by system 100 of FIG. 1, by PAN Master 115 and mobile node 130 or 135 which may include a processor (not shown), or by other suitable machines, cause the machine to perform a method and/or operations in accordance with embodiments of the invention. System 100 may include channel X 120 for network 110 and channel Y 125 for network 105. Mobile nodes 130 and 135 may be in communication with PAN master 115. Such machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Re-Writeable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

An embodiment of the present invention provides a machine-accessible medium that provides instructions, which when accessed, cause a machine to perform operations comprising enabling heterogeneous secure associations in Wireless Fidelity Personal Area Networks (WiFi PAN) by designating as a regular mobile node (MN) a MN which establishes a security association with a PAN Master as it is advertised by said PAN Master and designating as an outstanding MN an MN which establishes a security association which differs from that advertised by said PAN Master, and differentiating by said PAN Master between subscribed and not subscribed multicast packets and if a currently processed frame is sent to a subscribed multicast address and both said Regular MN and said Outstanding MN are subscribed to said multicast address, then said PAN Master will convert the frame to unicast and will send to each subscribed Outstanding MN using its unicast security model.

Further, the machine-accessible medium may further comprise said instructions causing said machine to perform operations further comprising sending the frame as regular multicast one for all Regular MNs.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

We claim:

1. A method for heterogeneous secure associations in Wireless Fidelity Personal Area Networks (WiFi PAN), comprising:
    designating as a regular mobile node (MN) a MN which establishes a security association with a PAN Master as it advertised by said PAN Master and designating as an outstanding MN as a MN which establishes a security association which differs from that advertised by said PAN Master; and
    differentiating by said PAN Master between subscribed and not subscribed multicast packets and if a currently processed frame is sent to a subscribed multicast address and both said Regular MN and said Outstanding MN are subscribed to said multicast address, then said PAN Master will convert the frame to unicast and will send to each subscribed Outstanding MN using its unicast security model, wherein said MN and said Master are implemented in hardware or a combination of hardware and software.

2. The method of claim 1, wherein said PAN master thereby processes multiple unicast frames instead of single multicast one.

3. The method of claim 1, further comprising for all Regular MNs, said PAN Master will send the frame as regular multicast.

4. The method of claim 1, wherein if a currently processed frame is targeted to an unsubscribed multicast destination, then said PAN Master will process it in regular transmit flow.

5. The method of claim 1, further comprising initiating a subscription handshake by said MN to become eligible to receive multicast traffic protected by a security model agreed at association time.

6. The method of claim 1, further comprising using a 2-way Multicast Frame Subscription handshake to activate Access Point mechanisms to improve multicast traffic reliability by said MN.

7. An apparatus, comprising:
    a mobile node (MN) operable in a Wireless Fidelity Personal Area Networks (WiFi PAN) using heterogeneous secure associations;
    wherein said MN is designated as a regular MN which establishes a security association with a PAN Master as it advertised by said PAN Master or designated as an outstanding MN which establishes a security association which differs from that advertised by said PAN Master; and
    wherein said PAN Master differentiates between subscribed and not subscribed multicast packets and if a currently processed frame is sent to a subscribed multicast address and both a Regular MN and an Outstanding MN are subscribed to said multicast address, then said PAN Master will convert the frame to unicast and will send to each subscribed Outstanding MN using its unicast security model, wherein said MN and said Master are implemented in hardware or a combination of hardware and software.

8. The apparatus of claim 7, wherein said PAN master thereby processes multiple unicast frames instead of single multicast one.

9. The apparatus of claim 7, wherein if said apparatus is a regular MN and part of all Regular MNs, said PAN Master will send the frame as regular multicast.

10. The apparatus of claim 7, wherein if a currently processed frame is targeted to an unsubscribed multicast destination, then said PAN Master process it in regular transmit flow.

11. The apparatus of claim 7, further comprising said MN initiating a subscription handshake to become eligible to receive multicast traffic protected by a security model agreed at association time.

12. A non-transitory machine-accessible medium that provides instructions, which when accessed, cause a machine to perform operations comprising:

enabling heterogeneous secure associations in Wireless Fidelity Personal Area Networks (WiFi PAN) by designating as a regular mobile node (MN) a MN which establishes a security association with a PAN Master as it is advertised by said PAN Master and designating as an outstanding MN an MN which establishes a security association which differs from that advertised by said PAN Master, and differentiating by said PAN Master between subscribed and not subscribed multicast packets and if a currently processed frame is sent to a subscribed multicast address and both said Regular MN and said Outstanding MN are subscribed to said multicast address, then said PAN Master will convert the frame to unicast and will send to each subscribed Outstanding MN using its unicast security model, wherein said MN and said Master are implemented in hardware or a combination of hardware and software.

13. The machine-accessible medium of claim 12, wherein said PAN master thereby processes multiple unicast frames instead of single multicast one.

14. The machine-accessible medium of claim 12, further comprising said instructions causing said machine to perform operations further comprising sending the frame as regular multicast one for all Regular MNs.

15. The machine-accessible medium of claim 12, wherein if a currently processed frame is targeted to an unsubscribed multicast destination, then said PAN Master process it in regular transmit flow.

16. The machine-accessible medium of claim 12, further comprising said instructions causing said machine to perform operations further comprising initiating a subscription handshake by said MN to become eligible to receive multicast traffic protected by a security model agreed at association time.

17. The machine-accessible medium of claim 12, further comprising said instructions causing said machine to perform operations further comprising using a 2-way Multicast Frame Subscription handshake to activate Access Point mechanisms to improve multicast traffic reliability by said MN.

18. A system, comprising:

a Wireless Fidelity Personal Area Networks (WiFi PAN) master;

at least one mobile node (MN) configured for heterogeneous secure associations with said PAN master;

wherein said at least one MN is designated as a regular mobile node (MN) if it establishes a security association with said PAN Master as it advertised by said PAN Master or designated as an outstanding MN if it establishes a security association which differs from that advertised by said PAN Master; and wherein said PAN Master differentiates between subscribed and not subscribed multicast packets and if a currently processed frame is sent to a subscribed multicast address and both a Regular MN and an Outstanding MN are subscribed to said multicast address, then said PAN Master will convert the frame to unicast and will send to each subscribed Outstanding MN using its unicast security model, wherein said MN and said Master are implemented in hardware or a combination of hardware and software.

19. The system of claim 18, wherein said PAN master thereby processes multiple unicast frames instead of single multicast one.

20. The system of claim 18, further comprising initiating a subscription handshake by said MN to become eligible to receive multicast traffic protected by a security model agreed at association time.

21. The system of claim 18, further comprising using a 2-way Multicast Frame Subscription handshake to activate Access Point mechanisms to improve multicast traffic reliability by said MN.

* * * * *